United States Patent Office 2,871,186
Patented Jan. 27, 1959

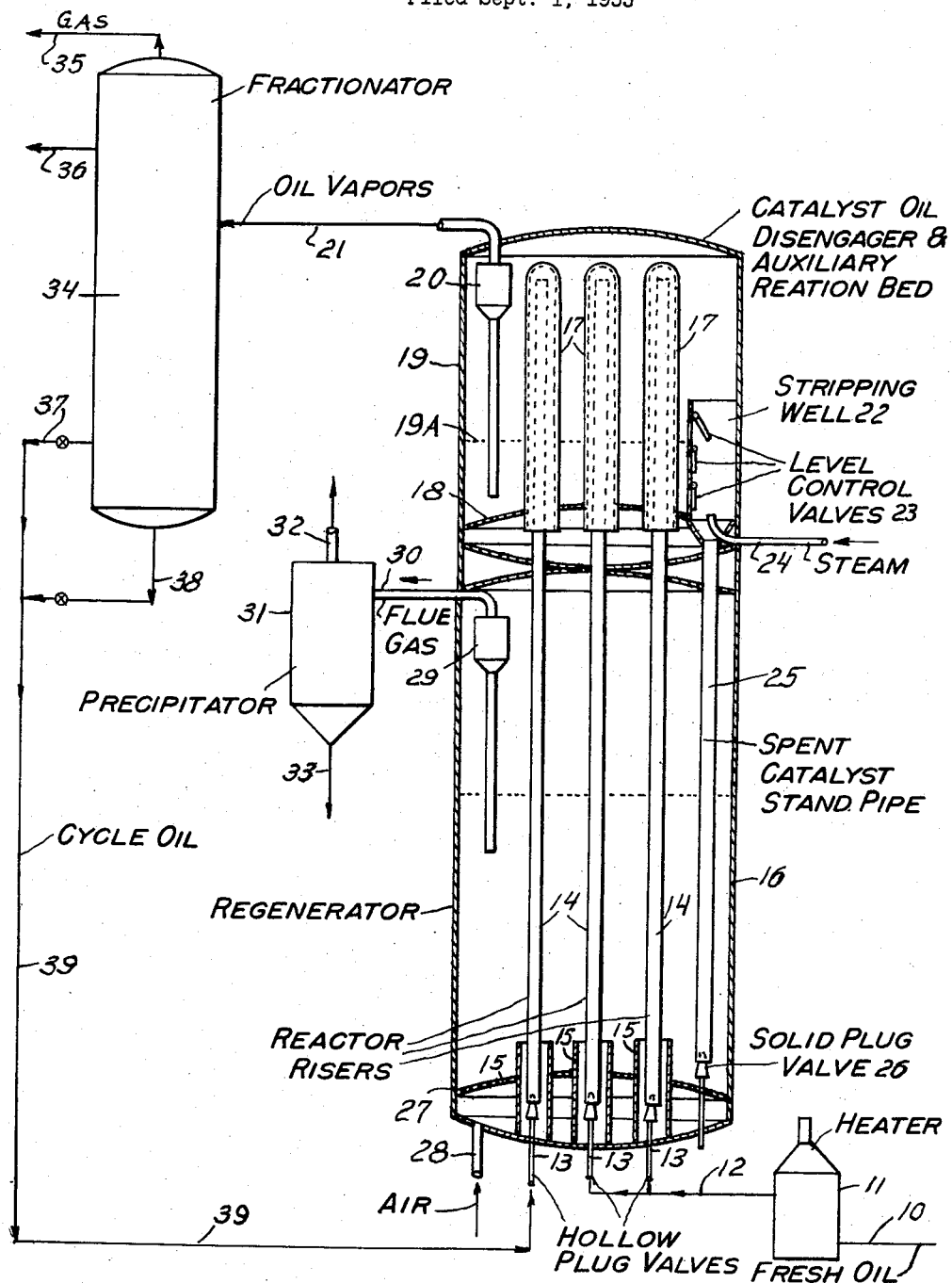

2,871,186

CATALYTIC CRACKING SYSTEM

Cecil J. Francisco, Homewood, Ill., and Theodore H. Schultz, Munster, Ind., assignors to Sinclair Refining Company, New York, N. Y., a corporation of Maine Application September 1, 1953, Serial No. 377,756

1 Claim. (Cl. 208—147)

This invention relates to a novel method for conducting the conversion of heavy hydrocarbon charge oil in the presence of a finely divided catalyst to lighter hydrocarbon products.

The commercial application of catalytic cracking has resulted in design compromise between considerations of equipment cost, operational feasibility and flexibility, reaction kinetics and product distribution. Thus conventional fluidized bed operation permits continuous non-fluctuating operation in both reaction and regeneration zones, permits relatively economical burning of large coke deposits for catalyst regeneration, is very flexible as to quantities and types of feed, is relatively cheap in investment and operating cost, and may use catalysts of widely varying activity. On the other hand, product distribution, that is the proportion of desirable gasoline to undesirable coke and gas at any given conversion, is below optimum because the severity required to obtain a given conversion is relatively high. This factor together with the fact that the bulk of the reaction occurs in the homogeneous reaction system provided by the fluidized bed results in a high concentration of gasoline throughout the bed, with net degradation of gasoline to coke and gas. In addition, the high degree of backward-forward mixing causes a portion of the more reactive constituents of the charge to be discharged from the reaction zone before having had time to react sufficiently while a portion of the more refractory, less desirable constituents are retained too long and undergo too much reaction, resulting in increased coke and gas.

The application of progressive reaction, by which we refer to a kinetic situation in which all molecules of a reacting constituent are subjected equally to increasing reaction time or catalyst contact, to catalytic cracking results in improved product distribution but as conventionally applied has appeared disadvantageous in operational feasibility, flexibility and cost. Thus although fixed bed operation provides progressive reaction, the operation is intermittent, costly and relatively inflexible with respect to variations in capacity, feed and catalyst. Moving bed systems employing a pellet or pill type catalyst in compact bed form provide continuous operation but are costly and also relatively inflexible with respect to capacity, feed and catalyst.

When fluidized catalyst processing is modified to obtain progressive reaction by flowing powdered catalyst with oil vapor concurrently through an elongated reaction zone at a high enough velocity to prevent forward-backward mixing, or through a reaction zone separated by baffles into many stages, great improvement in product distribution results. From the kinetic standpoint, low concentration of product exists over most of the reaction period, and adverse selective rejection of reaction constituents is eliminated. Although the progressive flow system has many of the advantages of the fluidized process, continuous operation, easy regeneration, relative cheapness of equipment and operation, it is relatively inflexible in range of conversion and control of operating variables. It requires a relatively reactive feed stock, a relatively active catalyst or a very high catalyst-to-oil ratio for operating feasibility. Moreover, it is difficult to provide sufficient mass of catalyst in the reaction zone to obtain high conversion levels in equipment of feasible size, cost and design.

We have now devised a method for conducting the conversion of heavy hydrocarbon charge oil in the presence of a finely divided catalyst under conditions providing progressive flow and reaction through a plurality of elongated reaction zones which provides flexibility in range of conversion of varying feed stocks, temperature control in the reaction zone and increased conversion capacity in a unit of practicable size.

According to our invention, a fluidized bed of finely divided catalyst is maintained in each of an upper confined reaction zone and a lower confined regeneration zone disposed in vertical alignment. A plurality of suspensions are formed of finely divided catalyst withdrawn from the lower portion of the regeneration zone in vapors of petroleum hydrocarbon charge stocks to be converted, having a density of about 5 to about 10 pounds per cubic foot. Each suspension is flowed initially at a linear velocity exceeding about 12 to 15 feet per second upwardly through a separate elongated vertically confined reaction path extending through the regeneration zone to the upper portion of the reaction zone then downwardly to the lower portion of the catalyst bed in the reaction zone. A substantial portion of the conversion of the petroleum hydrocarbon charge stock is effected in the confined reaction paths while the latter are maintained in heat exchange relation with the fluidized catalyst bed in the regeneration zone. The effluent from each confined reaction path is discharged into the lower portion of the fluidized catalyst bed maintained in the reaction zone and the remainder of the conversion of the petroleum charge stock is effected in the fluidized catalyst bed. Hydrocarbon vapors and spent catalyst are separately withdrawn from the reaction zone and the spent catalyst is passed to a stripping zone and then to the regeneration zone where it is regenerated by contact with a regeneration gas. Advantageously feed stocks including recycle streams are segregated according to their conversion properties and separately charged to individual reaction paths under optimum conversion conditions for the particular stock. The level of the fluidized catalyst bed in the upper reaction zone may be varied to obtain the desired total conversion on the hydrocarbon charge stocks charged to the elongated reaction paths. Thus the system of our invention provides a compact low-cost arrangement for catalytic hydrocarbon conversion under conditions of progressive flow and reaction with the catalyst in suspension in an elongated reaction path. The reversal of the stream flow in the elongated reaction paths according to our invention permits substantial conversion under conditions of progressive reaction in a unit of commercially feasible size whereas only insubstantial conversion would occur in a unit of similar height without the added length of the reaction paths provided by their reversal of direction. Heat is supplied to the reaction paths as they pass through the fluidized catalyst bed in the regeneration zone offsetting the normal decline in temperature along an elongated reaction path and maintaining conversion at a higher level. Additional flexibility with respect to extent of conversion is provided by adjusting the level of the fluidized catalyst bed in the upper reaction zone to provide any additional desired conversion of the various charge stocks.

The invention will be further described by reference to the flow diagram of the accompanying drawing.

Fresh oil is charged by line 10 to heater 11. The vaporized charge oil is conducted by line 12 and hollow-stem plug valves 13 to reactor tubes 14 (of which three are shown) in which it is admixed with regenerated catalyst flowing from the cups 15 surrounding the base of reactor tubes 14 in the regenerator 16. The reaction mixture is flowed as a stream upwardly through reaction tubes 14 and downwardly through reversal tubes 17 and is discharged beneath grid 18 in enlarged reactor 19. The reaction mixture passes upwardly through grid 18 and the increased area provided in reactor 19 causes the catalyst to settle and collect as a bed, the level of which is indicated at 19-A. The bed level, 19-A, in reactor 19 is adjusted to give the desired extent of conversion by appropriate regulation of control valves 23. Reaction vapors are withdrawn from reactor 19 through a cyclone separator or system of cyclones 20 and line 21.

Spent catalyst from the fluidized bed in reactor 19 passes into stripping well 22 by means of bed level control valves 23 where it is stripped with steam injected by connection 24. The stripped catalyst gravitates through spent catalyst standpipe 25 and solid plug valve 26 into regenerator 16 where it undergoes regeneration in a fluidized state above grid 27 by contact with air introduced by line 28. Flue gas disengaging from the catalyst bed is withdrawn from regenerator 16 through a cyclone separator or system of cyclones 29 and line 30 to Cottrel precipitator 31. The flue gas is discharged by means of line 32 to a stack and separated catalyst is withdrawn through line 33 and returned to the reaction system after removal of fines.

The reaction vapors withdrawn from reactor 19 by line 21 are cooled and fractionated in fractionator tower 34 from which, for example, an overhead gas stream by line 35, a gasoline product stream by line 36, a light cycle oil stream by line 37 and a heavy oil slurry stream by line 38 may be removed. The light cycle oil stream may be returned by line 39 to the reaction system and is introduced to one of reactor tubes 14 by one of hollow-stem plug valves 13. The cycle oil returned to the reaction system by line 39 as a feed component may comprise the light cycle oil from line 37, a heavy cycle oil from line 38, a blend of light and heavy cycle oils or a cycle oil from an extraneous source. Similarly, light and heavy cycle oils may be separately introduced into different reactor tubes 14. The cycle oil charge preferably is vaporized in a heater (not shown) to form the necessary suspension medium for the catalyst.

In operation according to the invention, the charge stocks are preheated sufficiently, taking into account the sensible heat of the catalyst, to provide the desired reaction temperature for each stock. Typically a reaction temperature of about 850° to 1000° F. is provided. In view of the heat supplied indirectly to reactor tubes 14 by the catalyst bed undergoing regeneration in regenerator 16, a portion of the feed stock may be introduced in liquid form.

The reaction conditions are adjusted according to the charge stock and the conversion level desired. The reaction temperature is in the range of about 850° to 1000° F.; the catalyst-to-oil ratio is in the range of 10:1 to 25:1; and the weight hourly space velocity is in the range of about 5 to 50.

Our invention has its greatest advantage in application to catalytic cracking of heavy petroleum hydrocarbon stocks. Typical stocks are light and heavy gas oils obtained by primary distillation, vacuum distillation or coking from crude oils of various sources and reduced crudes. The boiling range of these stocks may vary over a wide range, e. g. 450° to 600° F. for light gas oils and 600° to 800° F. for heavy gas oils. The invention is applicable to other petroleum hydrocarbon conversions. For example, catalytic reforming operations may be conducted with a finely divided catalyst under conditions of progressive flow reaction. Typical reforming stocks are heavy naphthas, particularly straight run naphthas of 250° to 450° F. boiling range.

We claim:

In the conversion of petroleum hydrocarbons in the presence of a finely divided solid catalyst under flow conditions providing progressive reaction, the method which comprises maintaining a fluidized bed of finely divided catalyst in each of an upper confined reaction zone and a lower confined regeneration zone disposed in vertical alignment, forming a plurality of suspensions of finely divided catalyst withdrawn from the lower portion of the regeneration zone in vapors of petroleum hydrocarbon charge stocks to be converted having a density of about 5 to about 10 pounds per cubic foot, flowing each suspension initially at a linear velocity exceeding about 12 to 15 feet per second upwardly through a separate, elongated, vertical confined reaction path extending through the fluidized catalyst beds in the regeneration and reaction zones to the upper portion of the reaction zone, deflecting the upward flowing suspensions downwardly in separate confined reaction paths through the fluidized catalyst bed in the reaction zone and discharging the hydrocarbon vapor-catalyst suspensions from each confined reaction path in the lower portion of the reaction zone, thus effecting a substantial portion of the conversion of the petroleum hydrocarbon charge stocks in the confined reaction paths and effecting the remainder of the conversion in the fluidized catalyst bed of the reaction zone, withdrawing hydrocarbon vapors from the reaction zone above the level of the fluidized catalyst bed, withdrawing spent catalyst from the reaction zone, passing the spent catalyst through a stripping zone to the regeneration zone, and regenerating the catalyst in the regeneration zone by contact with air.

References Cited in the file of this patent

UNITED STATES PATENTS

| | | |
|---|---|---|
| 2,302,328 | Kelly | Nov. 17, 1942 |
| 2,396,109 | Martin | Mar. 5, 1946 |
| 2,514,288 | Nicholson | July 4, 1950 |
| 2,617,708 | Peery | Nov. 11, 1952 |
| 2,629,684 | Leffer | Feb. 24, 1953 |